United States Patent
Aasen

(10) Patent No.: US 6,938,298 B2
(45) Date of Patent: Sep. 6, 2005

(54) MOBILE CLEANING ROBOT FOR FLOORS

(76) Inventor: Turbjorn Aasen, Hatlestadlia 122, N-5227, Nesttun (NO)

( * ) Notice: Subject to any disclaimer, the term of this patent is extended or adjusted under 35 U.S.C. 154(b) by 388 days.

(21) Appl. No.: 10/168,433

(22) PCT Filed: Oct. 29, 2001

(86) PCT No.: PCT/NO01/00429

§ 371 (c)(1),
(2), (4) Date: Oct. 15, 2002

(87) PCT Pub. No.: WO02/39864

PCT Pub. Date: May 23, 2002

(65) Prior Publication Data

US 2003/0126701 A1 Jul. 10, 2003

(30) Foreign Application Priority Data

Oct. 30, 2000 (NO) .......................... 20005460
Jul. 27, 2001 (NO) .......................... 20013685

(51) Int. Cl.[7] ................................................ A47L 9/00
(52) U.S. Cl. ............................. 15/319; 15/340.1; 15/98
(58) Field of Search .................. 15/98, 49.1, 1.51, 15/319, 340.1; 700/245–246, 250, 254, 256, 258, 260, 262; 318/568.1, 568.11; 901/1

(56) References Cited

U.S. PATENT DOCUMENTS

| | | | | |
|---|---|---|---|---|
| 2,686,330 A | * | 8/1954 | Wales ........................... | 15/319 |
| 4,306,329 A | * | 12/1981 | Yokoi ........................... | 15/319 |
| 4,501,569 A | * | 2/1985 | Clark et al. .................. | 446/458 |
| 4,541,814 A | * | 9/1985 | Martin ....................... | 446/456 |
| 4,726,800 A | * | 2/1988 | Kobayashi ................... | 446/458 |
| 4,733,737 A | * | 3/1988 | Falamak ...................... | 180/7.1 |
| 6,481,515 B1 | * | 11/2002 | Kirkpatrick et al. ........ | 180/65.1 |
| 6,571,415 B2 | * | 6/2003 | Gerber et al. .................. | 15/98 |
| 6,594,844 B2 | * | 7/2003 | Jones .......................... | 15/49.1 |

FOREIGN PATENT DOCUMENTS

| | | | |
|---|---|---|---|
| SU | 1442242 | | 12/1988 |
| WO | 97/25239 | * | 7/1997 |
| WO | 99/30876 | * | 6/1999 |

* cited by examiner

Primary Examiner—Theresa T. Snider
(74) Attorney, Agent, or Firm—Francis C. Hand; Carella, Byrne, Bain et al.

(57) ABSTRACT

A mobile robot is described for random movement across a surface where a drive unit is arranged inside a top-hat. Cleaning equipment such as electrostatic dusters or equipment for vacuuming can be fixed to the top-hat so that the mobile robot functions as a cleaning robot.

15 Claims, 3 Drawing Sheets

MOBILE CLEANING ROBOT FOR FLOORS

The present invention relates to a mobile robot. In particular, the invention relates to a mobile cleaning robot.

The collection of dust particles on surfaces, and especially on floors, is a general problem in dwellings, office landscapes, laboratories and the like. Such collections of dust are unpleasant and, on many occasions, also represent a health problem for many asthmatics. Therefore, the floor spaces must be regularly washed or vacuumed. In most cases this is carried out manually.

It is an object of the present invention to provide a solution for the automatic removal of dust, and the present invention provides a mobile robot that can carry out such work. This solution shall not completely replace manual cleaning work, but shall be an addition to this, and thereby shall reduce the need for manual cleaning.

Thus, it is an object of the present invention to provide a mobile robot which, during a given period of operation, can remove a substantial part of the dust particles that can be found on a floor surface, for example in an office landscape.

With present technology, one has knowledge of complicated mobile robots. Programmes can control the movements of the robot so that it can be moved in a desired movement pattern.

For example, U.S. Pat. No. 5,440,216 describes a robot which is capable of being automatically moved to a station for charging of its batteries. U.S. Pat. No. 5,787,545 also describes a mobile robot for vacuuming.

However, both of these solutions are relatively complex and both use a processor for controlling the movement of the robot.

The object of the present invention is, however, to provide a very simple robot. This must be of a very simple design and construction, and it must be able to be produced so cheaply that individual people will be able to regard it as an inexpensive supplement to conventional cleaning equipment. This is not possible with the solutions that are described in the prior art.

Furthermore, it is an object of the present invention that the robot which is provided shall not comprise complicated control systems, and it is therefore an object not to make use of computer processors to control the movement of the robot.

In the two solutions which are indicated above, the drive unit itself is permanently built into the top-hat itself. An object of the present invention is, however, to achieve a "random direction of movement", and this is best achieved if a large number of different factors will influence the "choice of direction of movement". One way of achieving this is to let the robot be subjected to many "impact moments", i.e. situations in which the robot, or the driving gear, collides with another object, which initiates a change in direction.

By arranging the drive unit in the top-hat in such a way that the drive unit is not fixed to the top-hat, but can be moved freely in relation to this, within an area which is limited by the top-hat, the number of impact points, or impact moments, will increase substantially, as the change in direction will also be initiated by the driving gear hitting the inside of the top-hat.

To our knowledge such systems are not described in the prior art, and therefore, with the present invention, a new movable robot is provided, and this can be used for many different applications. As the object of the development work with the robot was to develop a robot for cleaning, the examples which are given below are directed towards such an embodiment, but it must be pointed out that the invention comprises the robot per se, and the invention is not limited to robots which can be used for cleaning.

Thus, a central feature of the present invention is that the driving gear which brings about movement of the robot is not fixed to the top-hat itself.

A currently preferred embodiment of the drive unit in accordance with the invention is a ball in which, arranged inside the ball, is a driving gear which brings about a rotation of the ball.

Thus, the present invention is characterised in that it comprises a drive unit and a top-hat, where the drive unit is in contact with the surface, and that the drive unit is arranged inside and freely in relation to the top-hat, and where the top-hat, which at least partially surrounds the drive unit, in the section which is turned towards the surface, extends further than the drive unit such that a space between the top-hat and the drive unit is established so that the drive unit freely pushes towards and randomly moves the top-hat over the surface.

More detailed embodiments of the invention are described in the subclaims 2–13.

A presently preferred embodiment of the robot comprises a cleaning robot for removal of dust from a surface, in which one or more cleaning cloths, which are in contact with the surface that is to be cleaned, are fastened to the top-hat in a removable fashion.

The present invention will now be described in more detail with reference to the enclosed figures in which.

Figure 1:
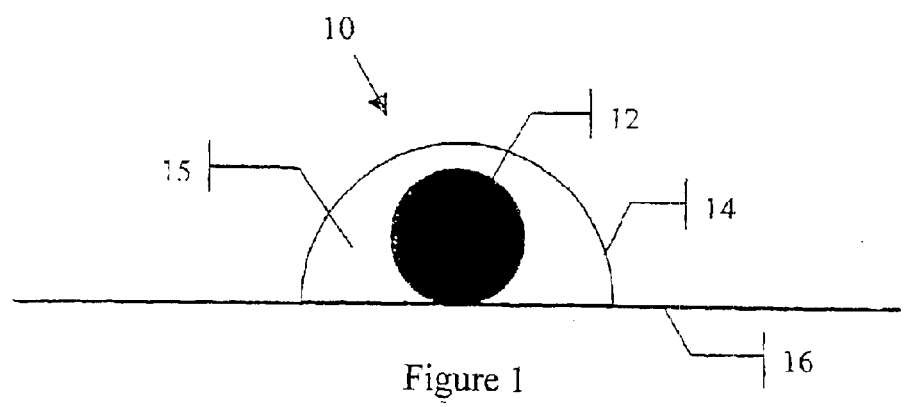
FIG. 1 shows, in a segment of a section, how a drive unit, in this embodiment a ball, is arranged inside a half-ball formed top-hat.

Referring to FIG. 1, wherein the central concept of the invention is described, the removable robot 10 is constructed of a drive unit 12 inside a housing 14 and is placed on a surface such as floor 16. In the embodiment shown, the drive unit 12 consists of a ball with a ball-shaped outer framework and an internal driving gear. The use of a ball as the drive unit for the robot is the preferred embodiment, but it must be pointed out that other drive units can also be used, for example drive units which use wheels. The central concept is that the drive unit 12 is not fixed to the housing 14.

The driving gear (not shown in the figures) which is used inside the ball can be of any kind, and thus the invention does not comprise the driving gear itself. For example, driving gears for balls, as described in WO 99/30876, WO 97/25239, and U.S. Pat. Nos. 4,733,737, 4,726,800, 4,541,814 and 4,501,569, can be used. The driving gear has electronic control circuits to start and stop the driving gear, and a power source, for example batteries. A presently preferred driving gear for the ball comprises a weight, the position of which can be changed by means of a driving gear, and where the weight moves along the inside of the framework of the ball so that the centre of gravity of the ball is changed as this brings about a movement of the ball. Thus the drive principle is based on a momentum of rotation.

It must be emphasised that to provide a cheap mobile robot is an object of the present invention, and the directions of the movements of the robot are therefore not controlled, i.e. no use is made of artificial neural networks or "fuzzy logic" or memory orientated control logic.

The housing 14 in a preferred embodiment is half-ball shaped, as shown in FIG. 1, has in the section which is turned towards the floor 16 a diameter which is somewhat larger than the diameter of the ball 12. The height of the housing 14 is preferably also somewhat larger than the diameter of the ball 12. This establishes a space 15 between the housing 14 and the ball 12. The ball 12 will be moved inside this space, and the combined action of the ball and the housing 14 will make the robot 10 move as the ball 12 pushes against the housing 14. When the robot 10 hits as object, for example the leg of a chair or a section of a wall, the escape control of the robot 10 will be based on a infinite number of random searches. This implies that the direction changes "randomly" as the robot 10 hits an object. The joint action between the movement dynamics of the ball 12 and its collision with the walls is also defined by the space 15, i.e. collisions between the drive unit and the housing 14 cause the ball 12 to get an arbitrary movement pattern independent of the objects the robot 10 collides with. Teats with the prototype has shown that the robot 10 is very capable of "coming free" from physical barriers on the floor 16.

The form of the ball 10 makes the ball 10 move with a low friction against the floor. The ball can be made from any material, but the material that constitutes the outer surface of the ball 10 must have sufficient friction against the floor so that the rotating movements of the ball result in the ball 10 being moved in relation to the floor.

The housing 14 can be manufactured in many different ways. The solution which is described above, with reference to FIG. 1, is only one alternative. In this solution, the whole ball is surrounded by the housing 14. Other representative embodiments of the housing 14 (hereinafter "top-hat") are explained below.

A further aspect of the invention relates to a cleaning robot. The central concept here is that it is possible to fix the cleaning means to the top-hat. In testing of this "cleaning robot", the inventor has shown that by using electrostatic cloths, dust and dirt are removed effectively from the floor which is to be cleaned.

To establish a cleaning robot it must be possible to secure cleaning means to the top-hat.

Figure 2:
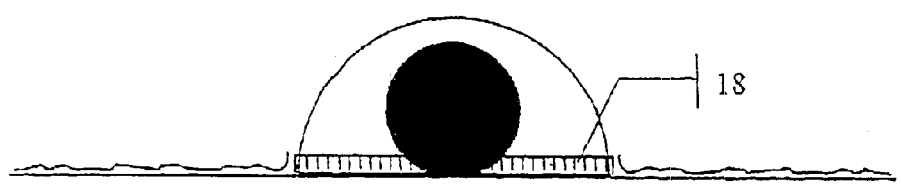
FIG. 2 shows a cleaning cloth fastened to the top-hat of the robot.

Thus, FIG. 2 shows a top-hat shaped that carries a velcro system 18 on a lower section for securement of a cleaning cloth.

Figure 5:
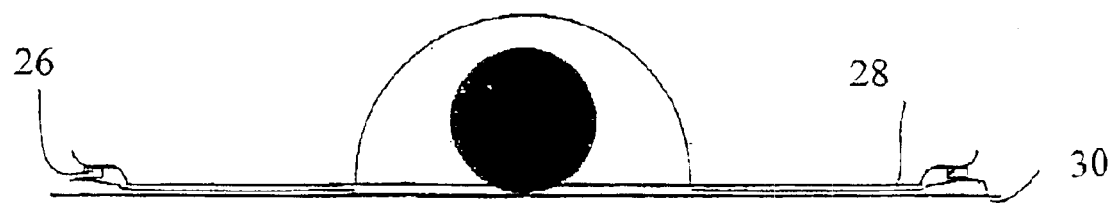
FIG. 5 shows an alternative embodiment of a top-hat, and how a cleaning cloth is fastened to it.
Figure 6:
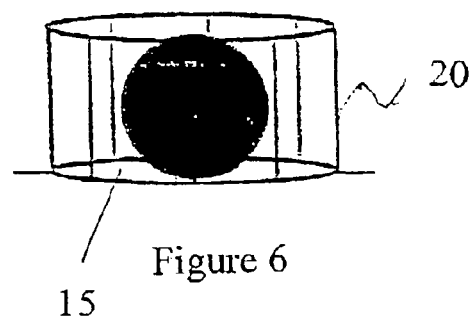
FIG. 6 shows an alternative embodiment of the top-hat.

Alternative embodiments of the top-hat are shown in FIGS. 5 and 6. In FIG. 6, the top-hat is not a half-ball formed hat which surrounds the whole ball, but just a framework 20 which sets the limits of the area of movement 15 for the ball. This framework has a height which is sufficient for collisions between ball and framework to effecting a movement of the framework.

Furthermore, an embodiment is shown in FIG. 5 in which the top-hat, in the section which is turned towards the floor, has a section 28 radially extending outwards to establish a surface onto which the cleaning cloth 30 can be fastened.

The presently most preferred embodiment of the invention is a combination of the features shown in FIGS. 5 and 6, i.e. the top-hat is just a framework, but with an outwardly extending section 28 for fastening of a cleaning cloth 30.

The cleaning cloth can, for example, be secured to the top-hat with velcro 26 (in most cases it is sufficient that the velcro is secured to the top-hat as the cloth material in itself will often attach itself to the Velcro). This solution implies that the cleaning cloth 30 lies pressed between the section 28 of the top-hat 12 and the floor 16, i.e. the cloth is arranged underneath the top-hat 12 itself. Therefore, arranged in the cleaning cloth, is an opening such that the drive unit is in contact with the floor.

The section 28 can have a circular shape, but other embodiments are also possible. For example, tested at present is a square section 28, with a square cloth 30, to see if this cleans more effectively along walls and in corners. Furthermore, it shall be mentioned that the dimensions of the cloth 30 do not need to be identical with the shape of the section 28. In a preferred embodiment, the cloth extends further than the section 28 so that the outermost part of the cloth will be more flexible (as it is not in contact with the section 28) such that it can be moved a small distance up adjoining surfaces (such as walls).

In a further alternative embodiment, the cleaning cloth itself is arranged over the top-hat. This embodiment is not shown in the figures.

If equipment with a considerable specific gravity in relation to the top-hat is to be fixed to the top-hat 14, for example a device for vacuum cleaning, the top-hat can be equipped with balls/wheels (not shown in the figures) down towards the floor so that the friction of the top-hat against the floor is reduced.

As mentioned previously, the movement pattern of the robot 10 is governed by the collisions which arise between the robot and objects in the room (chair legs, walls and the like), and by the collisions which occur between the drive unit and the inside of the top-hat. The robot will, therefore, after a given time have moved in an "arbitrary/random" pattern across the floor. Calculations can be made in which parameters such as the area and shape of the floor, furniture (chair legs and table legs, other office equipment and the like), area and extent of cleaning devices, the speed of the robot etc. is taken into account so that one can estimate the size of the fraction of the floor which will be treated during a given time. For example, one can estimate that 95% of the floor is treated at least once if the robot is allowed to move for 2 hours.

As the robot shall not completely replace conventional cleaning, an estimate of, for example 95%, will be sufficient in most cases. One can then imagine that the robot works in one office landscape a couple of hours every day after the personnel have finished their working day. See example 1 below.

Dusters can, for example, be used as cleaning means. It is preferred to use electrostatically charged dusters and these are available on the market. These will attract dust particles when they are pushed across the floor surfaces. As mentioned above, the shape of these dusters is adapted to the particular application together with the cleaning robot, i.e. possibly equipped with velcro adapted to the velcro of the robot, and they are equipped with an opening adapted for positioning of the top-hat and/or the drive unit.

Cleaning robots of this type, as is shown in FIG. 2, can be of any size, but for the prototype which has been developed, the ball has a diameter of 10 cm, and the top-hat has a diameter, for the section which is turned towards the floor, of about 20 cm.

Figure 3:
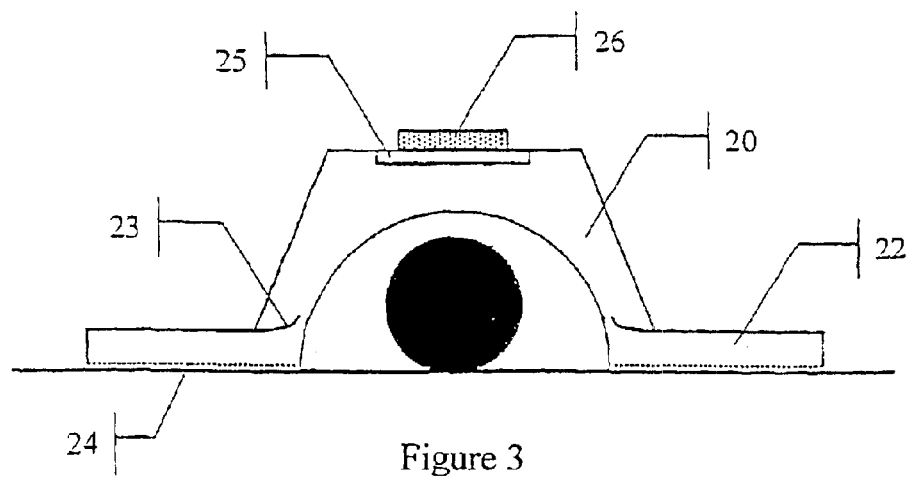
FIG. 3 shows how a vacuum suction unit is fitted to the top-hat of the robot.

An embodiment is shown in FIG. 3 where the cleaning equipment is a vacuum suction unit. In the embodiment shown in the figure, the top-hat itself is shaped as a vacuum suction unit, such that the drive unit pushes the vacuum suction unit along the floor surface. Again it is preferred that the cleaning robot is very simple, and to establish a vacuum suction, it is in principle sufficient with two chambers 20 and 22 in which a fan 26 establishes an under-pressure such that air is sucked though a one-way valve 23 by way of a number of openings 24 facing down towards the floor surface, and into the chamber 20. The air is filtered through a filter 25 before it exits from the chamber 20.

Alternatively, a vacuum suction unit is secured to a top-hat of the type shown in FIG. 2 or FIG. 6.

As the invention is exemplified with reference to application as a cleaning robot, i.e. equipped with either a duster or a vacuum cleaner, it shall be emphasised that the general concept of the invention consists of arranging a drive unit with a driving gear in a top-hat such that these together bring about a movement across the floor. Thus, the invention is not limited to robots which clean, but such cleaning robots as shown in the figures are at present the most preferred embodiments of the invention.

EXAMPLE 1

Simulation

Figure 4:
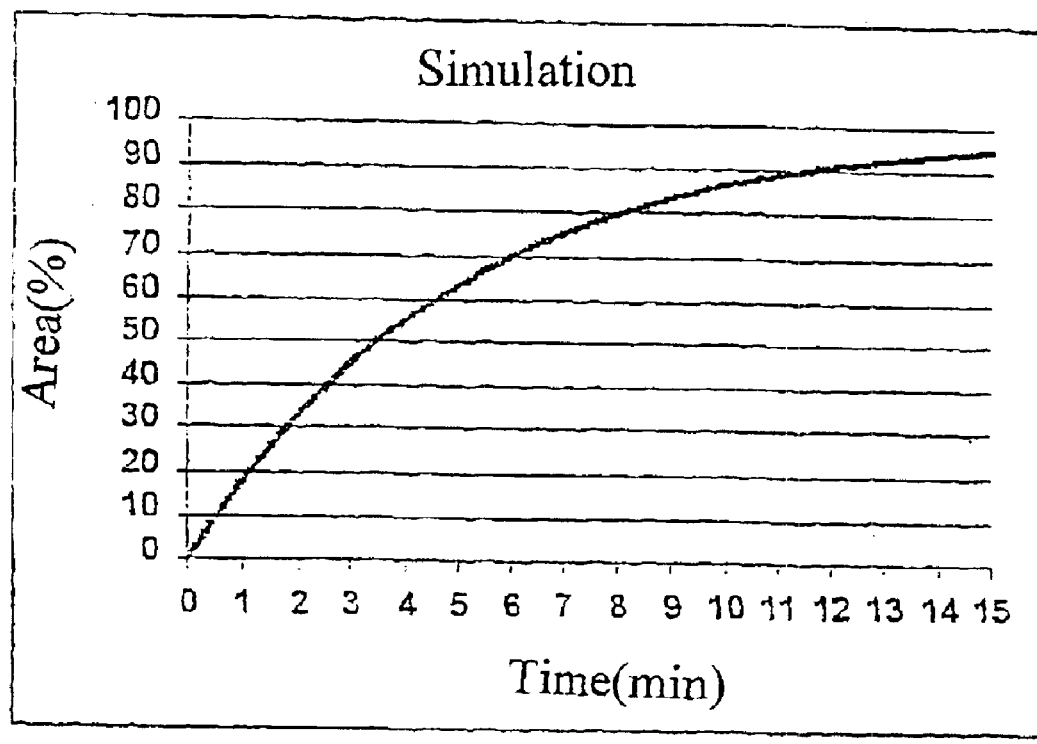
FIG. 4 shows a simulation of the time it will take to achieve treatment of a given area.

A simulation based on a theoretical model is shown in FIG. 4.

$A_{tot}$: The total area (cm²)
$K_b$: Width of the cloth (cm)
$K_h$: Speed of the cloth (cm/sec)
A(i): Area (cm²) which is covered; i is an index which is updated every second.

$$A(i+1)=A(i)+(K_b*K_h)*A_{tot}-A(i)/A_{tot}$$

For every update (i.e. every second) a new area is added, $K_b*K_h$, which is adjusted with a factor which decreases with the area that is already covered. With the parameter values $A_{tot}$=5 m*6 m=30 m² (300000 cm²), $K_b$=20 cm and $K_h$=50 cm/sec it will, for example, take 11½ min to cover 90% of the area. Reference is made to FIG. 4 which shows the relationship between percentage area that is covered by the electrostatic duster and operating time.

What is claimed is:

1. A self-propelled mobile cleaning robot comprising
   a housing;
   means for securing a dust cloth to said housing; and
   a drive unit within said housing and projecting downwardly from said housing to rollably engage a floor surface, said drive unit being characterized in being unconnected to and movable relative to said housing whereby said drive unit is able to impact against said housing from within said housing to cause said housing to move along the floor surface and in being movable on a momentum of rotation principle whereby upon actuation said drive unit moves across the floor surface in a random manner.

2. A self-propelled mobile cleaning robot as set forth in claim 1 wherein said drive unit has a ball shape.

3. A self-propelled mobile cleaning robot as set forth in claim 1 wherein said drive unit is battery operated.

4. A self-propelled mobile cleaning robot as set forth in claim 1 wherein said housing is of semi-spherical shape.

5. A self-propelled mobile cleaning robot as set forth in claim 1 wherein said housing is of cylindrical shape.

6. A self-propelled mobile cleaning robot as set forth in claim 1 wherein said means secures the dust cloth in a radially outwardly directed manner.

7. A self-propelled mobile cleaning robot as set forth in claim 1 which further comprises a fan mounted on said housing for drawing air upwardly into said housing from the floor surface.

8. A self-propelled mobile cleaning robot as set forth in claim 7 further comprising a one-way valve having a plurality of openings facing the floor surface for drawing air therethrough, a chamber within said housing for receiving air from said valve and a filter between said fan and said chamber for filtering dust from air drawn through said chamber.

9. A self-propelled mobile cleaning robot comprising
   a housing;
   a dust cloth removably secured to said housing; and
   a drive unit within said housing and projecting downwardly from said housing to rollably engage a floor surface, said drive unit being characterized in being unconnected to and movable relative to said housing whereby said drive unit is able to impact against said housing from within said housing to cause said housing to move along the floor surface and being movable on a momentum of rotation principle whereby upon actuation said drive unit moves across the floor surface in a random manner.

10. A self-propelled mobile cleaning robot as set forth in claim 9 which further comprises a fan mounted on said housing for drawing air upwardly into said housing from the floor surface.

11. A self-propelled mobile cleaning robot as set forth in claim 10 further comprising a one-way valve having a plurality of openings facing the floor surface for drawing air therethrough, a chamber within said housing for receiving air from said valve and a filter between said fan and said chamber for filtering dust from air drawn through said chamber.

12. A self-propelled mobile cleaning robot as set forth in claim 9 wherein said means secures the dust cloth in a radially outwardly directed manner.

13. A self-propelled mobile cleaning robot comprising
   a housing; and
   a drive unit within said housing and projecting downwardly from said housing to rollably engage the floor surface, said drive unit being characterized in being unconnected to and movable relative to said housing whereby said drive unit is able to impact against said housing from within said housing to cause said housing to move along the floor surface and in being movable on a momentum of rotation principle whereby upon actuation said drive unit moves across surface in a random manner.

14. A self-propelled mobile cleaning robot as set forth in claim 13 which further comprises a fan mounted on said housing for drawing air upwardly into said housing from the floor surface.

15. A self-propelled mobile cleaning robot as set forth in claim 14 further comprising a one-way valve having a plurality of openings facing a floor for drawing air therethrough, a chamber within said housing for receiving air from said valve and a filter between said fan and said chamber for filtering dust from air drawn through said chamber.

* * * * *